United States Patent

Huber

(10) Patent No.: US 12,193,421 B2
(45) Date of Patent: Jan. 14, 2025

(54) SUBMERSIBLE LIFE SUPPORT DEVICE FOR AQUATIC ECOSYSTEMS

(71) Applicant: Algae Research and Supply, Inc., Carlsbad, CA (US)

(72) Inventor: Matthew Peter Huber, Carlsbad, CA (US)

(73) Assignee: Algae Research and Supply, Inc., Carlsbad, CA (US)

( * ) Notice: Subject to any disclaimer, the term of this patent is extended or adjusted under 35 U.S.C. 154(b) by 0 days.

(21) Appl. No.: 17/829,332

(22) Filed: May 31, 2022

(65) Prior Publication Data

US 2023/0380389 A1 Nov. 30, 2023

(51) Int. Cl.
  *A01K 63/06* (2006.01)
  *F21V 31/00* (2006.01)
  *F21Y 107/30* (2016.01)
  *F21Y 115/10* (2016.01)

(52) U.S. Cl.
  CPC .......... *A01K 63/065* (2013.01); *F21V 31/005* (2013.01); *F21Y 2107/30* (2016.08); *F21Y 2115/10* (2016.08)

(58) Field of Classification Search
  CPC . A01K 63/065; F21V 31/005; F21Y 2107/30; F21Y 2115/10
  See application file for complete search history.

(56) References Cited

U.S. PATENT DOCUMENTS

| | | | | |
|---|---|---|---|---|
| 4,203,841 A | * | 5/1980 | Shimizu | C02F 3/34 210/220 |
| 4,995,980 A | * | 2/1991 | Jaubert | C02F 3/32 210/615 |
| 7,578,933 B1 | * | 8/2009 | Selman | A01K 63/04 119/260 |
| 7,682,821 B2 | | 3/2010 | Woods et al. | |
| 7,980,024 B2 | | 7/2011 | Berzin et al. | |
| 8,569,050 B1 | * | 10/2013 | Ericsson | C12M 21/02 435/292.1 |
| 8,955,249 B2 | * | 2/2015 | Veres | A01G 33/00 47/1.4 |
| 9,057,043 B2 | * | 6/2015 | Flynn | C12M 41/48 |
| 9,388,372 B2 | * | 7/2016 | Wilson | A01K 63/06 |
| 9,695,389 B2 | * | 7/2017 | Wilson | A01G 7/045 |
| 10,696,841 B2 | | 6/2020 | Xie et al. | |
| 10,933,388 B1 | * | 3/2021 | Falcone | B01F 35/189 |
| 11,008,239 B2 | * | 5/2021 | Thai | C02F 3/32 |

(Continued)

*Primary Examiner* — Tsion Tumebo
(74) *Attorney, Agent, or Firm* — Lowry Blixseth APC; Scott M. Lowry (57) ABSTRACT

Light, heat, gas exchange, and water motion are all required elements to sustain aquatic photosynthetic organisms. Rather than providing separate systems, a flux of photons appropriate for photosynthetic organisms, including algae, is dispersed throughout the surrounding water. A gas source performs water movement and circulation by acting as an airlift pump while performing a liquid-gas mass transfer. Finally, heat is added to the surrounding liquid by a heat source or the light source, which increases the rate at which microorganisms grow and improve efficiencies. By combining these necessary components for aquatic life support, efficiencies are increased, costs are saved, and photosynthetic organism growth is regulated.

12 Claims, 5 Drawing Sheets

(56) References Cited

U.S. PATENT DOCUMENTS

| | | | | |
|---|---|---|---|---|
| 2005/0135104 A1* | 6/2005 | Crabb | ................... | C12M 31/10 |
| | | | | 362/276 |
| 2010/0170151 A1 | 7/2010 | Huber | | |
| 2010/0261260 A1* | 10/2010 | Morgan | ............... | B01D 53/007 |
| | | | | 435/257.1 |
| 2011/0089106 A1* | 4/2011 | Arbel | ..................... | C02F 3/301 |
| | | | | 210/194 |
| 2012/0079755 A1* | 4/2012 | Torres | ................... | A01K 97/02 |
| | | | | 43/17.5 |
| 2012/0288917 A1* | 11/2012 | Krenbrink | ............. | C12M 33/00 |
| | | | | 362/382 |
| 2013/0095544 A1* | 4/2013 | Berlowitz | ............. | C12P 7/6463 |
| | | | | 435/166 |
| 2013/0280757 A1* | 10/2013 | Dvorak | ................. | C12M 27/20 |
| | | | | 435/257.1 |
| 2014/0116962 A1* | 5/2014 | Punzo | ..................... | B63J 4/002 |
| | | | | 210/748.11 |
| 2015/0275161 A1* | 10/2015 | Gressel | ................. | C12M 23/06 |
| | | | | 435/257.1 |
| 2020/0199506 A1* | 6/2020 | Flynn | ..................... | C12M 31/10 |

\* cited by examiner

SUBMERSIBLE LIFE SUPPORT DEVICE FOR AQUATIC ECOSYSTEMS

BACKGROUND OF THE INVENTION

1. Field of Invention

The invention relates to aquatic ecosystems and more particularly, submersible devices to support photosynthetic life-forms.

2. Description of Related Art

Manufactured aquatic ecosystems are created to cultivate products and perform functions that aid humans in performing work. Most aquatic ecosystems grow biomass that includes algae, fish, plants, animals, fungi, viruses, bacteria, and the materials produced by those organisms. Typical work done by an aquatic system includes removing unwanted substances from water, wastewater treatment, oxygen production, and carbon dioxide sequestration. For aquatic systems to support photosynthetic life, four factors must be maintained. Those factors are light, heat, gas exchange, and water movement. Conventional systems rely on four separate devices to address each factor.

Aquatic ecosystems and aquaculture employing lights often use bright point-source lights. Point-source lights are small lamps featuring clear outer glass bulbs revealing the arc tube, bare incandescent filament, or LEDs that produce a high flux of photons to produce dramatic highlights, pronounced shadows, and a narrow light beam. Yet, bright point-source lights can damage photosynthetic organisms that often get too close to the light source and are oversaturated with photons. Oversaturation causes the organisms to suffer from photo-inhibition, a process by which photoautotrophs spend and waste energy to prevent damage to their photosynthetic apparatus when there is typically an overexposure of light. Thus, a light-induced reduction in the photosynthetic capacity of a photosynthetic organism occurs. Point-source lights emit a range of 2,000 to 5,000 photons per pmoles/$m^2$s which is far above the saturation intensity of 120 photons per pmoles/$m^2$s. Point source lights produce too great amount of light intensity for efficient photosynthesis. Thus, a copious amount of energy is wasted. Along with being too bright, point light sources do not penetrate to the desired depth in water or other liquid media.

Further, aquatic ecosystems utilizing a transparent water tank typically have lights attached to the outside of the tank and the water's surface reflects light. Tank lights are expensive to purchase and maintain, and the tank or vessel is costly. Additionally, since the lights are on the outside of the system, the lights are subject to water reflection due to Snell's Law and photons are attenuated since they generally pass through a transparent vessel, such as a tank or polybag. Moreover, the water held in the tank is heated through conventional water heaters by featuring an insulated tank where a heater promotes warmer water or heat to the surrounding water to increase the water temperature. In tankless water heating systems, water is warmed by entering super-heated coils.

Meanwhile, gas diffusers introduce oxygen and carbon dioxide in an aquatic system by dissolving gas bubbles for mass transfer into the aquatic ecosystem. Additionally, atmospheric air pumps are attached to the outside of a tank and connected to the air diffuser inside of the tank which produces bubbles to diffuse gas throughout the water and create water circulation. The bubbles are filled with atmospheric air to equalize the concentrations of dissolved gases in the aquatic ecosystem with the atmosphere. When the bubbles rise towards the surface, the water located near the substrate is lifted to the top. This process keeps repeating to effectively circulate the water in a tank or aquatic system.

Circulation prevents certain algae types and weeds from over-growing in still water and controls large unwanted algae blooms. Circulation also improves water chemistry and moves dissolved nutrients around, making them less available for algae and weeds. This is particularly useful in eutrophic and low oxygen aquatic systems. By reducing the availability of nutrients, circulation systems control the growth of aquatic weeds.

Manufactured aquatic ecosystems do not provide proper maintenance, regulation, and inclusion of light, heat, gas exchange, and water motion. There exists a need to provide an aquatic life-sustaining device that provides optimally controlled light, heat, gas exchange, and water motion.

SUMMARY OF THE INVENTION

The present invention overcomes these and other deficiencies of the prior art by utilizing a single device to optimally control light, heat, gas exchange, and water movement in an aquatic ecosystem. Advantageously, the aquatic ecosystem life support disperses light over a wide radius to aquatic ecosystems and increases the amount of photosynthetically active radiation available for organisms while the device is fully submerged. Because the aquatic ecosystem life support is completely submerged, the system's efficiency is increased since minimal photons are wasted or lost. The heat generated by the conversion of electricity to photons in typical LEDs or other lights is normally wasted. Yet, here, the heat is instead transferred to the water as light and heat, both of which increase the growth of photosynthetic organisms.

Furthermore, the present invention increases the circulation of any liquid medium. More specifically, in aquaculture and aquatic ecosystems, the present invention increases and, in certain instances, can be the sole source of circulation. Beyond circulation, the present invention applies advection in specified directions. Creating advection, a current, or bulk fluid motion increases gas exchange. In an aquatic ecosystem, the present invention attenuates sedimentation of organic matter, which reduces the buildup of debris or detritus and hydrogen sulfide. Thus, anaerobic areas of the ecosystem that are not helpful in most aquatic systems are reduced as well as any rotten-egg odor. Advantageously, promoting oxygenation and resuspension of organic sediment deposits accelerate the microbial breakdown of natural debris collected and decomposed in aquatic ecosystems.

In addition, the present invention creates a gas exchange that controls dissolved gasses and prevents them from reaching toxic levels in aquaculture systems. For example, a healthy algae culture produces oxygen which can build up over several times the concentration of the atmosphere in any media. The build-up of concentrated oxygen damages the pigments of aquatic phototrophs which cause permanent damage. The gas exchanger of the present invention increases the water's surface area where the gas and water meet at an interface by dissipating oxygen and creating water movement via bubbles at the gas/water interface. The present invention also, via the gas exchange, provides oxygen for heterotrophic cultures where fish are present consuming oxygen at a rapid pace. Meanwhile, because carbon dioxide is required in photosynthesis, $CO_2$ can be added and resupplied as needed, which, when carbon dioxide levels are low limits aquatic organism growth. Heterotrophic cultures expel carbon dioxide waste which often gets trapped in water, but the present invention's gas exchange and water motion dissipate the carbon dioxide out of the water.

Additionally, the present invention increases the volume of liquid exposed and the volume of photosynthetic organism culture exposed compared to point-source lights due to the wide flux of saturating photons. The photon dispersal illuminates a significant volume water that sustains and increases the amount of photosynthetic activity. For example, in dense algae cultures, light attenuates quickly often within the first 10.0 cm. Beneficially, photons are emitted over the entire cylindrical surface area of the present invention, increasing the total volume of liquid exposed to saturating levels of photons. Because the light is generated, so is the heat required to warm aquaculture operations. Yet, the temperature for peak photosynthetic enzyme reaction rates is above room temperature, thus heat is applied. Light systems convert electrical energy to photons, but most energy is lost as wasted heat. Accordingly, the present invention captures the heat from the light and warms the surrounding liquid.

In an embodiment of the present invention, light, heat, gas exchange, and water motion are regulated and provided via a hollow tube that encompasses, a light source and a heat source that may be the same or separate elements and a gas source or diffuser. The light source attaches to the hollow tube where the hollow tube is submerged to allow the lights to illuminate an aquatic ecosystem. The heat generated by the heat source is transferred into the water, and gas is introduced into one end of the hollow tube and expelled out the other, creating a gas exchange and water current or motion.

In another embodiment of the present invention, a predetermined intensity of photons is delivered in an aquatic ecosystem to assist in the growth of aquatic organisms, specifically algae. Water is circulated, which creates a current while gases are exchanged and mixed. While a light source emits photons, it can produce heat to the surrounding water since the present embodiment is fully submerged. Therefore, life-sustaining elements for aquatic life are established.

Advantageously, the present invention delivers a wide array of photons that saturate photosynthetic organisms causing little to no photoinhibition caused by oversaturation of light. Because light is delivered in a non-point-source manner—a wide field of view—organisms are exposed without oversaturation from point-source light. Thus, it saturates algae photosystems without causing photorespiration or photoprotection.

Beneficially, the present invention saves costs associated with running and maintaining lights by reducing energy and electricity use. Because the light is generated inside of the aquatic ecosystem rather than outside of the system, the present invention provides a fully submergible light source and reduces photons lost (as waste) out of the ecosystem because it delivers light submerged and to a wide field of view. The present invention also eliminates a mandatory tank or vessel and specifically eliminates a costly transparent tank or vessel. In addition, heat exchangers, water pumps for circulation, and a gas diffuser or mass-transfer device are commonly added in existing products. The present invention eliminates the need for a heat exchanger because the light source can emanate heat. It also provides one integrated light source, heat, gas exchange, and water motion.

The foregoing and other features and advantages of the invention will be apparent from the following, more particular description of the invention's preferred embodiments and the accompanying drawings.

BRIEF DESCRIPTION OF THE DRAWINGS

For a complete understanding of the present invention, the objects, and advantages thereof, reference is now made to the ensuing descriptions taken in connection with the accompanying drawings briefly described as follows.

DETAILED DESCRIPTION OF PREFERRED EMBODIMENTS

Preferred embodiments of the present invention and their advantages may be understood by referring to FIGS. 1-5, wherein like reference numerals refer to like elements. The described features, structures, or characteristics of the invention may be combined in any suitable manner in one or more embodiments. It will be apparent to those skilled in the art that various modifications and variations can be made to the present invention without departing from the invention's spirit and scope. Thus, it is intended that the current invention cover modifications and variations consistent with the scope of the appended claims and their equivalents.

The present invention may be deployed in any aquatic environment or ecosystem. When referring to environment or ecosystem, it refers to any system whether natural or manmade that pertains to a system featuring liquid. While the terms water and aquatic are used herein, the terms refer to any aqueous solution or liquid media because the present invention functions in any liquid media or liquid solution. Even though the term liquid is referenced, the present invention is not only applicable to liquid, but also applicable to systems with mixed solids and liquids. In addition, while the term gas is used herein, it is meant to refer to any gas, whether oxygen, carbon dioxide, or other life sustaining gas required for photosynthetic organisms and that is beneficial in aquatic ecosystems.

The present invention advances the utility of life supports for aquatic ecosystems by creating optimal light, heat, gas exchange, and water movement in one integrated device. Rather than utilizing separate devices to create light, heat, gas exchange, and water movement, the aquatic ecosystem life support houses four necessary elements to support photosynthetic life in aquatic ecosystems. There are added costs for each individual component used to sustain photosynthetic life in aquatic ecosystems and the present photosynthetic organism life support device eliminates these.

Beyond integrating all necessary photosynthetic elements into one device, the aquatic life support creates water circulation and a gas exchange that promote the health of aquatic ecosystems. The addition of circulation and increased circulation mitigates dead-zones of stagnant water and settling of detritus in aquatic ecosystems where microhabitats can negatively alter natural ecosystems' nutrient needs. While most aquaculture operations strive to achieve a monoculture of homogeneous physical, biological, and chemical conditions, harmful microhabitats that feature detritus build-up attract pathogens to targeted species. These pathogens may be weeds or other organisms that damage photosynthetic organisms and deplete available nutrients by competing for resources.

Instead of expelling light and heat as waste, the present invention uses the light and heat as life supporting resources for photosynthetic organisms by dispersing light and heat into the surrounding liquid medium. The photosynthetic organism life support can also be controlled by a control box either remotely or on the unit itself to power on/off, regulate parameters including light intensity, timing cycles, gas flow, rapid flashing of lights, and control other appropriate functions.

Figure 1A:
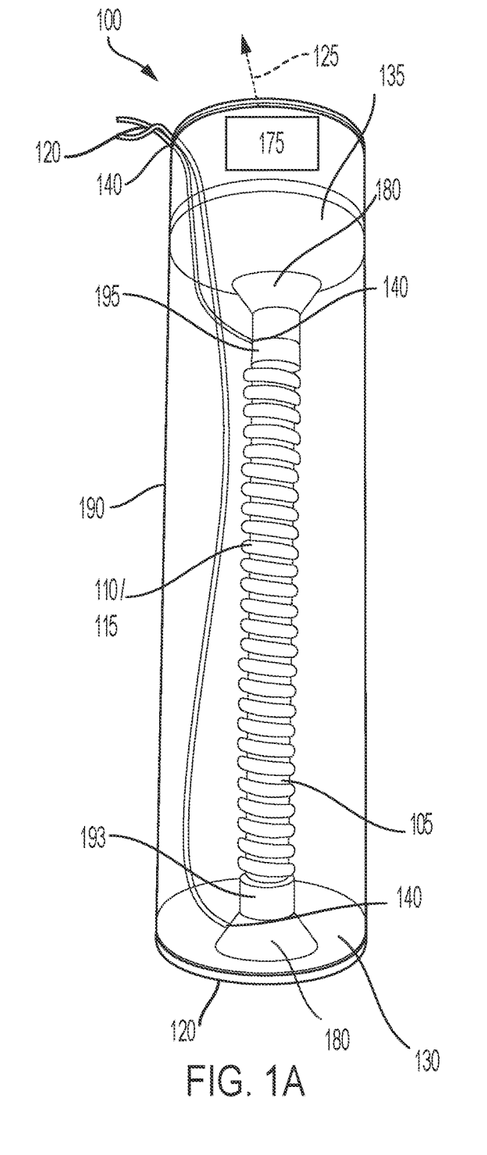
FIG. 1A illustrates a front view of a photosynthetic organism life support device with a light source on the inside, according to an embodiment of the invention.

FIG. 1A illustrates an aquatic ecosystem life support device 100 according to an embodiment of the invention. The life support device 100 is a standalone unit that provides optimal light, heat, gas exchange, and water movement in an aquatic ecosystem. The device 100 is waterproof, and all of its components including electrical circuitry are also waterproof. For example, the life support device 100 is covered with an epoxy and an optional silicon seal. Accordingly, the life support device 100 is fully submergible. Nonetheless, the life support device 100 may be operated without being submerged in water such as in a terrarium.

The life support device 100 comprises a hollow tube 105 having an inlet 130 and an outlet 135 at opposite ends, and has numerous attachment points 140, embodied as holes, ports, outlets, connectors, or other similar type devices throughout the hollow tube 105. The attachment points 140 are selectively placed as a user desires to connect different components, including a light source 110, heat source 115, and a gas source 120. For example, a gas line may connect to the attachment points 140. The attachment points 140 provide quick connect air fitting and connection ports for the light source 110. Further, the attachment points 140 may be any range of sizes but specifically include a diameter to fit at least one a 22 AWG round shielded wire, a power cord, and an air pump port, the implementation of which is apparent to one of ordinary skill in the art. An example of a wire size through the attachment points 140 is an IP67 rated cable and union where the wire is stripped at one end and soldered to the light source 110. The hollow tube 105 is any length for an appropriate application depending on the size of the liquid medium or body of water, but preferably is 12-36 inches for common algae cultures. It can be made of Polyvinyl chloride (PVC), silicone, polyurethane, polyethylene, polystyrene, polypropylene, or another similar material. In an embodiment of the present invention, the attachment points meet and connect to the corresponding fittings 180. The present invention is not limited to being a hollow tube 105 or tube shape. Still, it can comprise any hollowed or semi-hollowed elongated cylindrical structure or any flattened or squared structure that can optionally attach to a surface.

Figure 1B:
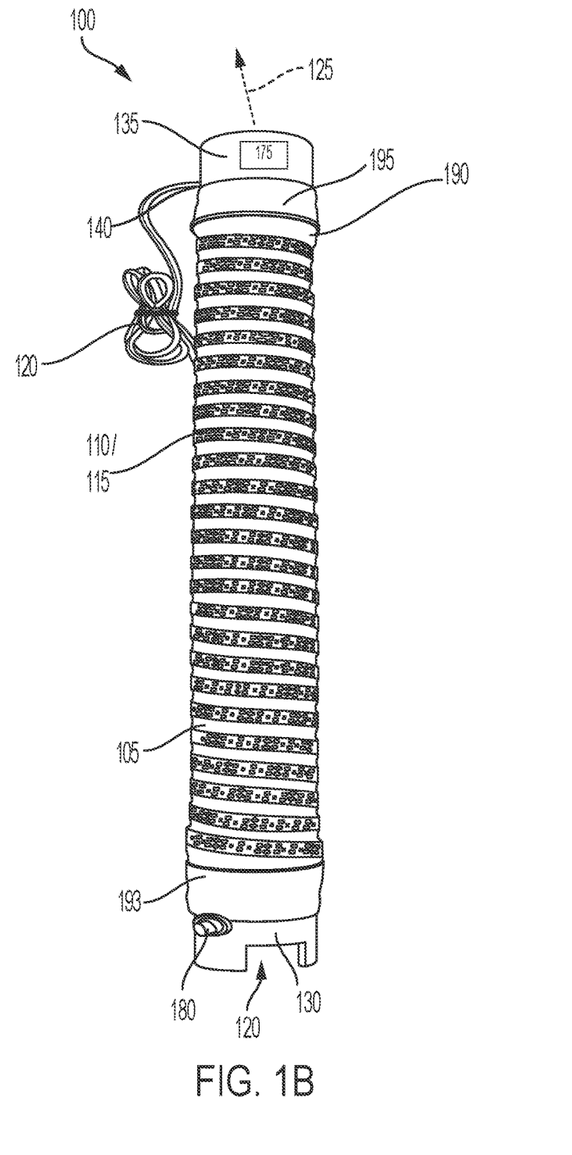
FIG. 1B illustrates a front view of a photosynthetic organism life support device with a light source on the outside, according to an embodiment of the invention.

Further, a light source 110 attaches to the hollow tube 105 on the outside of the hollow tube 105, as shown in FIG. 1B, inside a cover 190 as shown in FIG. 1A, connected to the hollow tube 105, or attached by any other similar manner, the implementation of which would be readily apparent to one of ordinary skill in the art. The light source 110 produces photons in the wavelengths between 400-700 nM (PAR), which is the preferred range of photons for algae photosystems. Thus, the light source 110 emits a range wavelengths of photons which increase the amount of photosynthetically active radiation (PAR) available for photosynthetic organisms. In an exemplary embodiment, the light source 110 is a strip of 24 v-30 w, 24 v-70 w, or 24 v-130 w LED lights producing any wavelength, including blue-red, white, and UV wavelengths and the lights are wound along the exterior of the hollow tube 105 and appropriately waterproofed. The light source 110 is also dimmable by a user to achieve a desired flux of photons. Device 100 and the light source 110 can comprise a plurality of sensors, including a motion sensor that detects motion to turn on the light source 110. The motion sensor may be an infrared sensor or any other similar sensor, the implementation of which would be readily apparent to one of ordinary skill in the art. Additionally, device 100 may comprise a temperature sensor or thermometer and provide a platform for other sensors including a sensor to detect the amount of dissolved oxygen, pH, turbidity, salinity, oxidation reduction potential (ORP), or any other aquatic measurement.

While the light source 110 is shown as wrapped around the hollow tube 105, the light source 110 may be attached, connected to, or inserted onto the hollow tube 105, the implementation of which is apparent to one of ordinary skill in the art. In an embodiment of the present invention, the light source 110 is incorporated an integrated into the hollow tube 105. The hollow tube 105 (and light source 110) can be inserted into a cover 190. The cover 190 can be similar to a shrink sleeve and/or a cylindrical container that is preferably made of PVC with a 2:1 or 3:1 shrink ratio of Polydefin and may be embodied as an electrical grade cover 190. A space or gap is created at the bottom of the cover 190 and the hollow tube 105 for air to pass through the inlet 130 and to the outlet 135 for water circulation. The bottom of the hollow tube 105 and the inlet 130 may undergo a heat shrink process to attach a first hollow tube clamp 193. A clear epoxy may be used as electrical potting to seal the light source 110 on the hollow tube 105. The epoxy is poured into the spaces between the hollow tube 105 covered with the light source 110 and the cover 190. The hollow tube 105 with the cover 190 may undergo heat shrink process, and while the hollow tube 105 compresses, the epoxy heats, which drives bubbles to the surface to create a seal. A second hollow tube clamp 195 may be attached to the top of the hollow tube 105, which ensures that all materials below the second hollow tube clamp 195 are coated in an epoxy or sealant. Because of the sealing process, device 100 is entirely submerged underwater where the light source 110 illuminates the surrounding water.

Fittings 180 may be disposed of along the hollow tube 105 and preferably located near the inlet 130 or outlet 135 and wrapped with a sealant to be waterproofed. Fittings herein refer to any ports, connectors, wire holes, and specifically, a compression fitting for a gas line, ports for air and $CO_2$ injection, non-destructive testing means, and any other similar fittings to provide light, heat, and water motion. Additionally, fittings herein refer to power cable plugs, wires, or connections or battery packs, as device 100 functions with a battery, plugged into a power source via a power cable, a renewable resource including solar panels, or another powering technology, the implementation of which is apparent to one of ordinary skill in the art.

A heat source 115 generates heat and transfers the heat into the surrounding water. More specifically, heat source 115 takes the excess heat from the light source 110 and dispels it to the surrounding water. In another embodiment of the present invention, the light source 110 acts as the heat source 115 to create and distribute heat throughout the surrounding water. As shown in FIGS. 1A and 1i, since the light source 110 may be the heat source 115, the figure numerals are illustrated as 110/115, meaning in the alternative or a heat source separate 115 from a light source 110. The heat source 115, when not the light source 110, may be embodied as heat coils or other similar heating technology housed within the hollow tube 105 or surrounding the hollow tube 105 and housed within the cover 190. The heat source 115 may also be a heat pump that extracts and uses heat from the ground, the surrounding air, and/or surrounding water to move heat from the inlet 130 through the hollow tube 105 and through the outlet 135. The heat source 115 may also be embodied as a solar water heater that transfers energy and heat through the hollow tube 105. Additionally, in an embodiment of the present invention, the hollow tube may send chilled heat-transfer fluid to the device 100, thus removing heat from the system. The heat is produced by coils or another a heating element, the effect of which consequently warms the water. While a solar water heater is mentioned, the heat source 115 may come from another form of renewable sources of energy including solar panels and wind turbines. The heat source 115 may also embody a condensing water heater that captures hot exhaust from the outlet 135 and redirects the gas 125 to a heat exchanger within the device 100. Finally, the heat source 115 may be another similar heat dissipating and generating system, specifically including any other form of renewable energy resources such as solar, wind, water movement, or a combination of thereof.

In another embodiment of the present invention, the heat from the heat source 115 is a result of the increased growth of microalgae due to the metabolic rate of algae being directly proportional to increased water temperature. The device 100 eliminates heat wasted by externally attached lights by producing heat and light all in one enclosed system. The heat source 115 and in some embodiments, the light source 110 converts 60% to 70% of the total power in wattage produced by the heat source 115 or light source 110 into heat and light. The light source 110 and heat source 115 disseminate life-sustaining needs for microalgae, macroalgae, photosynthetic bacteria, fish, shrimp, or other aquaculture organisms requiring light and heat. While the heat source 115 and increase may be due to the algae growth, the increased growth rate also can lead to water movement and circulation.

Furthermore, a gas source 120 generates a gas 125 injected into the inlet 130 of the hollow tube 105 and exits through the outlet 135 of the hollow tube 105. For example, the gas source 120 is a gas diffuser generating gas 125, including but not limited to air, $CO_2$, $O_2$, or any other gases. The gas source 120 provides a gas exchange with the surrounding liquid by exchanging the $O_2$ for $CO_2$ in photosynthetic systems or exchanging $CO_2$ for $O_2$ in heterotrophic systems. Gas exchange is achieved by releasing a volume of gas into the inlet 130 of hollow tube 105. The gas source 120 may comprise multiple gas sources, a gas diffuser, multiple gas diffusers, or no diffusers at all. In another embodiment, the gas source 120 may pull air from the atmosphere or from a powered or electric diffuser. For example, a gas 125 is pumped through a gas line, shown as the gas source 120 and diffuses the gas 125 through the hollow tube 105 through the outlet 135.

Additionally, the gas source 120 acts similar to an airlift pump by creating a current. Water is moved in a circular motion due to a liquid and gas 125 entering the inlet 130 and exiting the outlet 135, the implementation of which is readily apparent to one of ordinary skill in the art. The gas exchanger is not limited to functioning as an airlift pump but can be any other water pump or liquid circulator/mover. Moreover, the inlet 130 may be notched or any other shape, including conical in nature and created to receive, intake, and distribute gas and liquid. Advantageously, in a notched embodiment, suction of the inlet 130 to the bottom of a container or floor is reduced. When the device 100 and the hollow tube 105 are not horizontal, the gas 125 flows from the inlet 130 to outlet 135 of the hollow tube 105, creating water movement and promoting water circulation and motion. Not horizontal herein refers to a degree different than a 180-degree angle measured from a horizontal plane of the bottom of device 100.

In an embodiment of the present invention, the entirety of device 100, including the light source 110, heat source 115, and gas source 120, are controlled by a control box 175. The control box 175 controls a plethora of parameters including timers for on times and off times. The control box 175 also controls the power supply needed to supply the device 100, dimmers for the light source 110, motion sensors, other sensors, and a fuse or breaker. More specifically, the control box 175 controls the following parameters: the pressure of compressed air inside device 100, the volume of compressed air inside device 100, the light source 210, the heat source 215, the gas source 220, data logging, pH, ORP, dissolved oxygen turbidity, conductivity, salinity, fluorescence, selective ion probes, or any other aquatic parameters. The control box 175 herein refers to a physical controller or another similar controller, iPad, smartphone, tablet, automation equipment, programmable logic controller (PLC), or other mobile internet devices that communicates with device 100 whether on a network or not. Thus, the control box 175 controls device 100 remotely via wireless technology, on-site through wired connections, or a combination thereof. For example, a user may choose to use the control box 175 on-site and then control the device 100 remotely.

Figure 2:
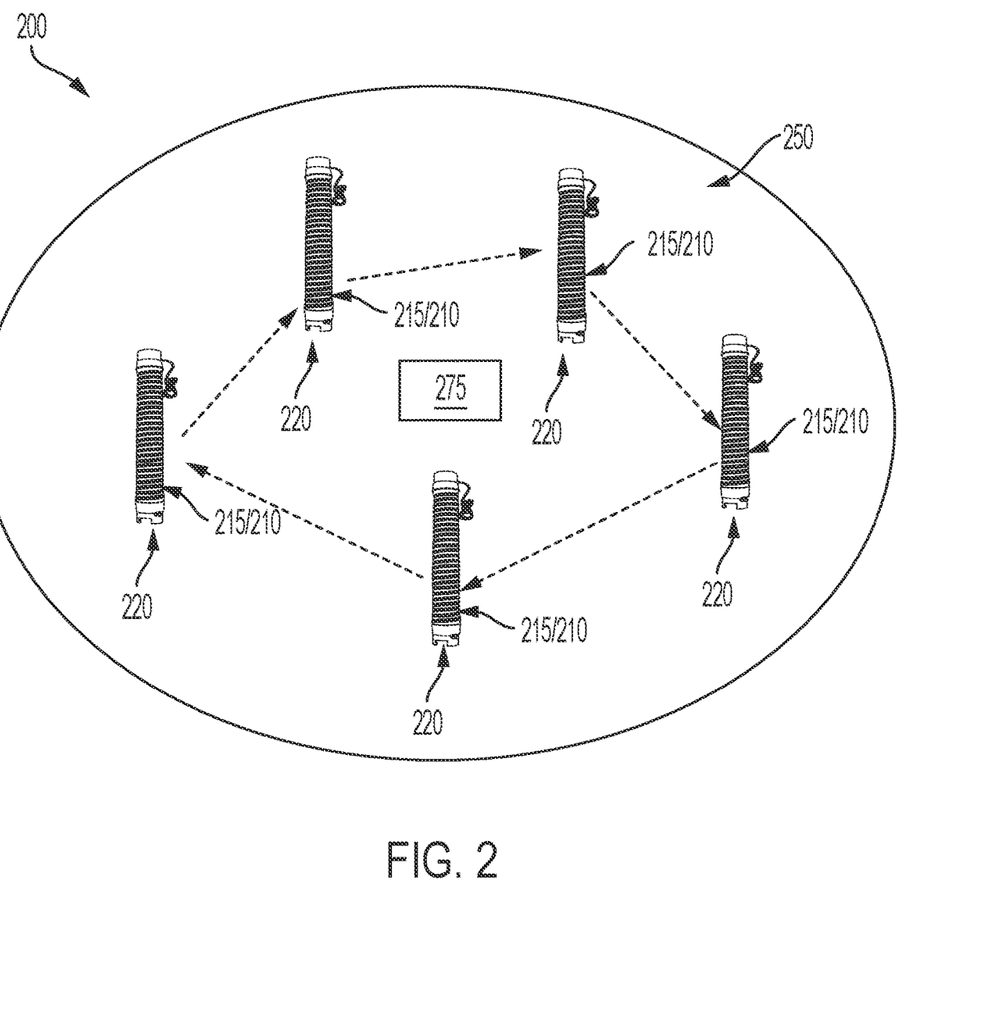
FIG. 2 illustrates a system of multiple photosynthetic organism life support device connected, according to an embodiment of the invention.

FIG. 2 illustrates a system 200 of multiple aquatic ecosystem life support devices 100 according to an embodiment of the invention. The system 200 creates a connection between each device 100. Connected herein refers to device 100 being physically connected via an attachment, cord, wire, or connected via a network, and other wireless connectivity technologies, including WIFI, Bluetooth, and near-field communication with RFID tags. Further, multiple devices 100 are fully submerged underwater 250 to spread and create light, heat, provide a gas exchange, and water circulation. A control box 275 can power on/off and control any individual device 100, selected group of devices 100, or the entire selection of devices 100 in the system 200. Control box 275 herein and for this embodiment, refers to a physical controller or another similar controller, iPad, smartphone, tablet, or other mobile smart device that communicates with device 100 whether on a network or not. More specifically, the control box 175 controls the following parameters: the pressure of compressed air inside device 100, the volume of compressed air inside device 100, the light source 210, the heat source 215, and the gas source 220 data logging, pH, ORP, dissolved oxygen turbidity, conductivity, salinity, fluorescence, selective ion probes, or any other aquatic parameters. The system 200 may be spread out or dispersed in any shape to provide light, heat, gas exchange, and water movement.

In an embodiment of the present invention, each device 100 may feature a motor, engine, jet, pully, or other propulsion technology to re-position the device 100. The control box 275 controls the motor of each device and may act as a master controller to control the entire system's 200 movement. The system 200 can self-align and move to float to the bottom or top of a chamber 350, an aquatic ecosystem, or other liquid media.

Figure 3:
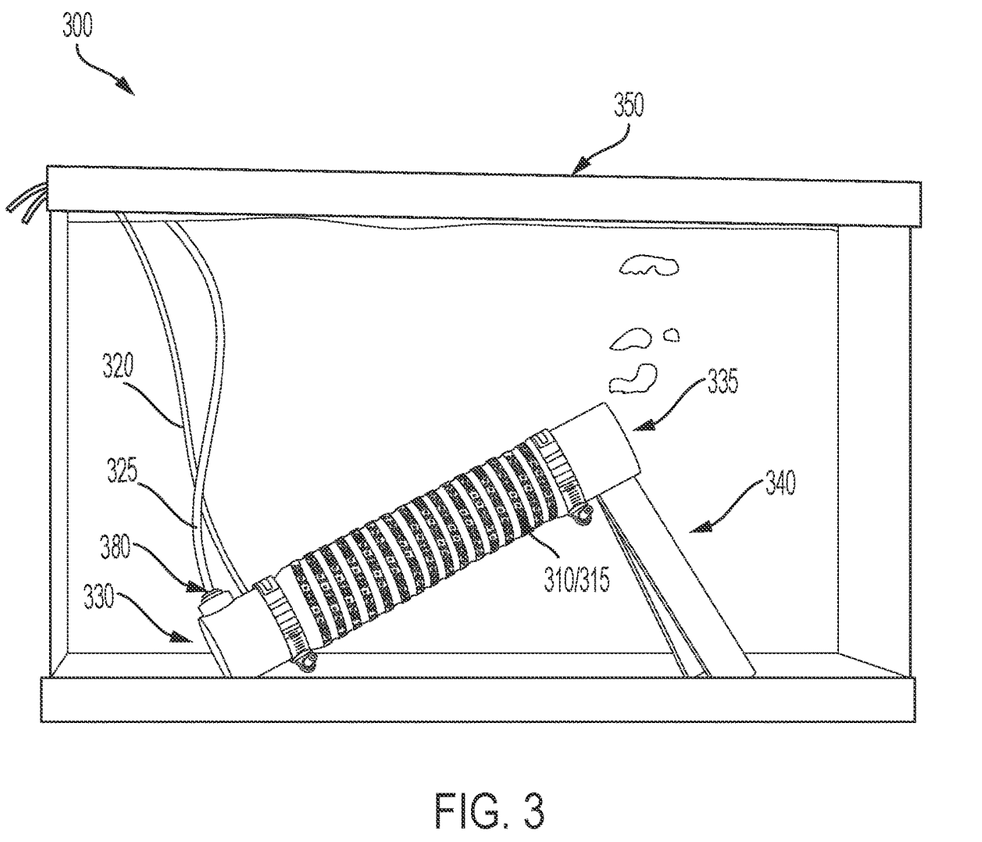
FIG. 3 illustrates a front view of a photosynthetic organism life support device within a chamber, according to an embodiment of the invention.

FIG. 3 illustrates device 100 housed within a chamber 350. Chamber 350 herein refers to a tank, aquarium, terrarium, or similar liquid holding structure or aquatic ecosystem. The chamber 350 may be transparent, translucent, or substantially transparent, or may be opaque and a clear chamber 350 is not required. While the chamber 350 is shown to be a square with a flat bottom and sides, the present invention is not limited, and it may be circular or any other shape. Chamber 350 also may be embodied as a terrarium that holds water, but is not fully contained with water. Further, the chamber 350 may have a non-flat bottom, e.g., a wavy bottom, to promote a current and water motion or a cone or conical shape to gather product and collect detritus. In an embodiment of the present invention, a stand 340 holds the device 100 near the outlet 335. The stand 340 raises the outlet 335 to create a not horizontal position for the gas to leave the outlet 335. The gas expelling from the outlet 335 creates a gas exchange and circulates water. Yet, the present invention does not require a stand 340 and it may be weighted down or floated by floats or buoys in certain applications to create a not horizontal position. While the stand 340 is depicted as two elongated pillars, it may be any shape provided it holds the device in a not horizontal position.

A flexible air hose 325 is connected to a fitting 380 at the inlet 330, where a gas source 320 diffuses a gas through the air hose 325. The gas source 320 expels bubbles through an outlet 335. The expelled gas in bubble form rises upwards to the water's surface. In an embodiment of the present invention, the chamber 350 is holds 90 L of liquid, and the heat source 315 and/or light source 310 create heat to increase the temperature between 1-8° C. depending on the power (wattage) of the heat source 315 and/or light source 310.

TABLE 1

Increase in Water Temperature of Device 100 in Chamber 350 Corresponding to Time and Air Temperature.

| Time (Hours) | Air Temperature (° C.) | Water Temperature (° C.) | Change in Water Temperature (° C.) |
| --- | --- | --- | --- |
| 0 | 19.7 | 20.8 | 0 |
| 2 | 19.8 | 22.0 | 2.2 |
| 5 | 20.0 | 23.0 | 3.0 |
| 7 | 20.8 | 24.0 | 3.7 |
| 10 | 19.5 | 24.5 | 5.0 |
| 21 | 18.1 | 26.0 | 8.0 |

While the light source 310 and device 100 move closer toward the center of chamber 350, PAR increases. At 15 cm away from the center of chamber 350, the light intensity measured as PAR in $\mu E/m^2 s$ is 200 $\mu E/m^2 s$, increases to 300 $\mu E/m^2 s$ at 10 cm away, and 700 $\mu E/m^2 s$ at 5 cm away.

TABLE 2

PAR as a Function of Distance from a Light Source Compared to Other Light Sources.

| Distance from Center of Chamber (cm) | Light Intensity as PAR ($\mu E/m^2 s$) of Device 100 within Chamber 350 Wattage Produced: 130 w | Light Intensity as PAR ($\mu E/m^2 s$) of Dual T8 Fluorescent Lamp Wattage Produced: 80 w | Light Intensity as PAR ($\mu E/m^2 s$) of LED-Shop Lamp w/ Reflector Wattage Produced: 30 w | Light Intensity as PAR ($\mu E/m^2 s$) of LED-Shop Lamp w/o Reflector Wattage Produced: 36 w |
| --- | --- | --- | --- | --- |
| 5 | 700 | 200 | 300 | 200 |
| 10 | 350 | 100 | 150 | 100 |
| 15 | 250 | 100 | 100 | 100 |
| 20 | 150 | 75 | 75 | 75 |
| 25 | 125 | 75 | 75 | 75 |
| 30 | 100 | 50 | 50 | 50 |
| 35 | 100 | 50 | 50 | 50 |
| 40 | 50 | 25 | 25 | 25 |
| 45 | 25 | 0 | 0 | 0 |
| 50 | 0 | 0 | 0 | 0 |

In an embodiment of the present invention, Table 2 depicts that the submerged device 100 dispels light via the light source 310 in a spherical manner in chamber 350. The light source 310 spreads light to all directions due to its spherical shape whereas other lights are external and face significant photon waste. More specifically, the gas source 320 creates a gas exchange and functions like an airlift pump that mixes water and, for example, pulls 15-40 LPM of water through chamber 350, creating a complete turnover inside chamber 350 every 2-6 minutes. The mixing speed is dependent on the airflow and is selectable by a user. In an embodiment of the present invention, the gas source 320 produces air pressure to force gas through an outlet 335 via a low-pressure air blower, an air intake system, a system using the natural force of the wind to cause air to travel through the gas source 320 and into the water, or any other similar pump technology. While the gas source 320 is described and shown as acting similar to an airlift pump, it can be a blower or a flattened device to circulate water. While bubbles are described, the gas exchange and water motion can be created by any shape or form of gas exchange.

In another embodiment of the present invention, the system 300 is incorporated into a pond, lake, ocean, or other larger aquatic ecosystem, whether manmade or natural. In these embodiments, the device 100 may be fully submerged and for example, may be attached to the underside of a buoy. The power element may be renewable resources such as a wind turbine, solar panels, water movement, or a combination thereof to power device 100 and provide the life supporting needs for aquatic ecosystems. Further, in the previously mentioned larger aquatic ecosystems, the device 100 features jets or another propulsion system to move the device 100 to the surface of a body of water. The device may also propel itself to the bottom of a body of water.

Figure 4:
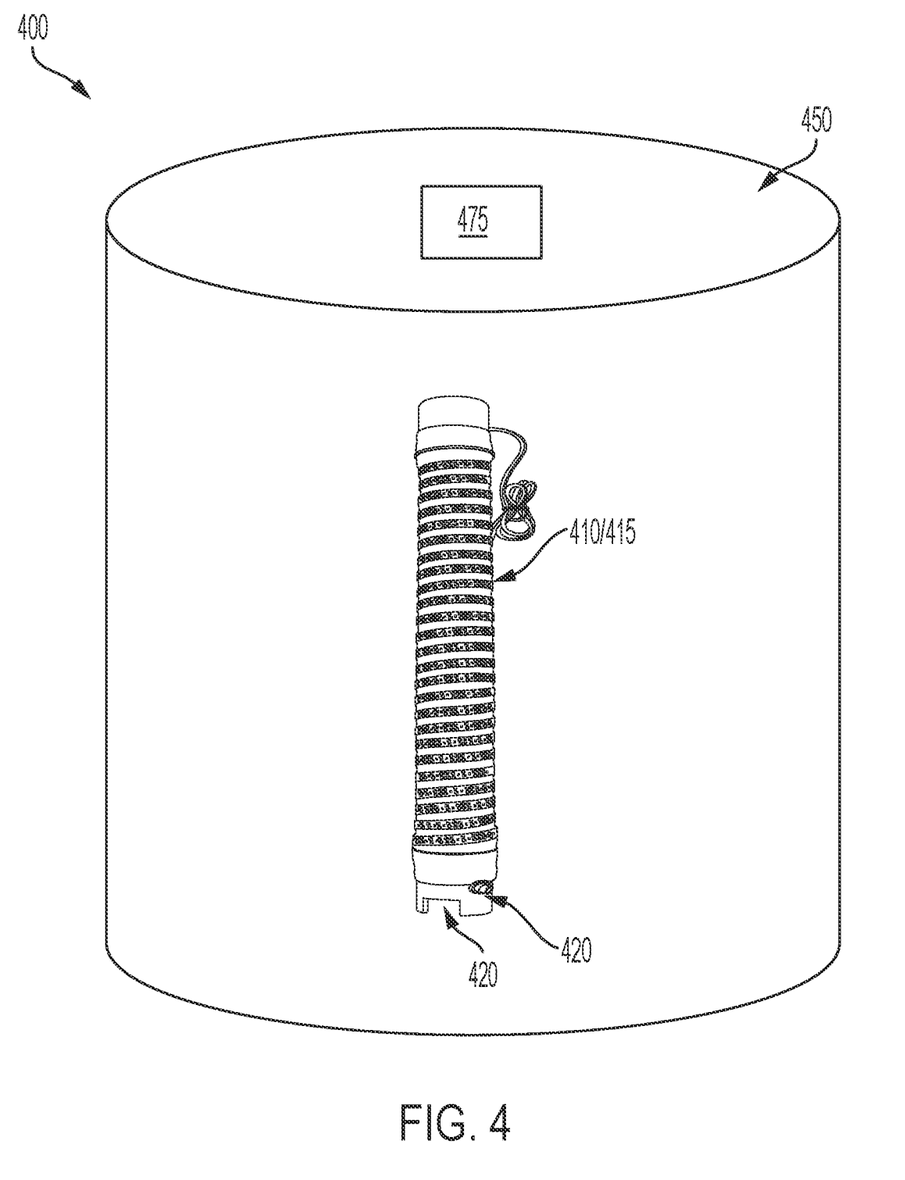
FIG. 4 illustrates a front view of a photosynthetic organism life support system as a photobioreactor, according to an embodiment of the invention.

FIG. 4 illustrates a system 400 of device 100 incorporated into a photobioreactor 450. The photobioreactor 450 comprises a light source 410 that distributes photons to phototrophic microorganisms which cultivates phototrophic microorganism growth and growth rate. Additionally, the photobioreactor 450 encompasses a heat source 415 a gas source 420, a plurality of sensors including pressure and temperature, data logging, pH, ORP, dissolved oxygen turbidity, conductivity, salinity, fluorescence, selective ion probes, or any other aquatic parameters. The gas source 420 may be an air pump with an optional $CO_2$ gas input to create a pH carbon control. The photobioreactor 450 may optionally comprise a sediment re-suspension on the bottom of the photobioreactor 450 to re-suspend settled materials. The System 400 increases the amount of PAR available for organisms by producing light, heat, a gas exchange, and water circulation. PAR increase results in organisms' intensified ability to perform photosynthesis to generate biomass from light and carbon dioxide. Certain biomass includes plants, mosses, macroalgae, microalgae, cyanobacteria, and purple bacteria. Further, the photobioreactor 450 allows for the addition of a variety of ingredients, products, mixes, additions, or inputs to the photobioreactor 450 to promote the growth of photosynthetic organisms. Beneficially, the photobioreactor 450 does not need to be transparent in nature and may be opaque to reduce capital costs and promote photosynthetic organism growth.

A controller 475 sets specific conditions, including temperature, pressure of the pumped air, and volume of the liquid in the photobioreactor 450 required to optimally grow and attract respective species. Additionally, other conditions can include data logging, pH, ORP, dissolved oxygen turbidity, conductivity, salinity, fluorescence, selective ion probes, or any other aquatic parameters. The controller 475 can also control the amount of materials or ingredients that are released into the photobioreactor 450. The release of ingredients can be manually or scheduled to release at specific times or intervals. The controlled addition of ingredients to the photobioreactor 450 provides for a user to determine the optimal parameters and conditions for photosynthetic organisms to thrive. Therefore, the photobioreactor 450 increases growth rates and water purity levels compared to natural aquatic ecosystems.

Figure 5:
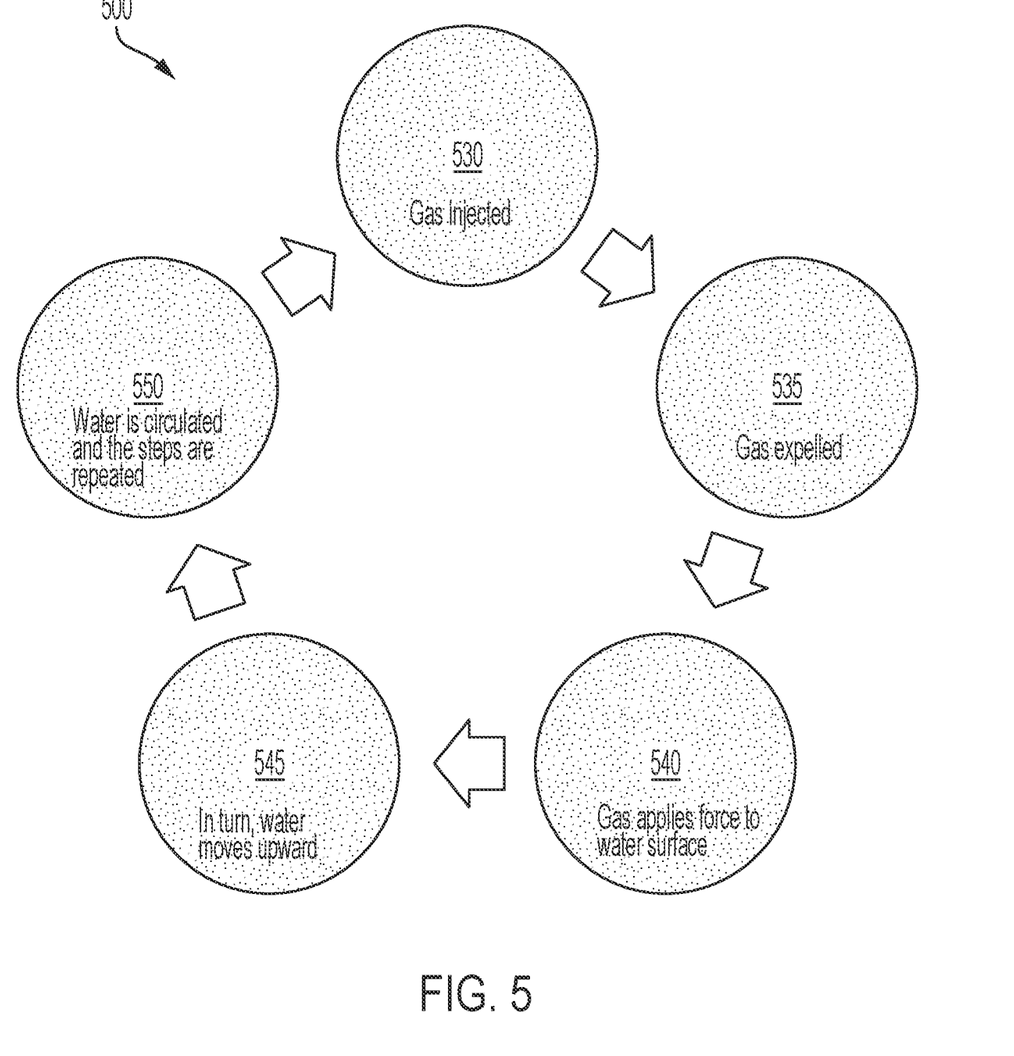
FIG. 5 illustrates a method of gas exchange and water circulation for photosynthetic organism life support, according to an embodiment of the invention.

FIG. 5 illustrates a method 500 of gas exchange and water circulation using device 100. The device 100 acts as an airlift pump to create water motion, turnover, mixing and a current while it is fully submerged in water. The water motion and gas exchange creates a mass transfer of dissolved gasses. At step 530 gas is injected from an inlet and is expelled at 535 through an outlet. The gas that is expelled dissipates into the water, typically in the form of bubbles. Once the gas is expelled, the bubbles apply a force 540 to the water, which causes the water to move upward 545. The upward force assists in creating the flow, motion, and circulation of water 550. For example, in situations when the oxygen is While the invention has been described in connection with a number of embodiments and implementations, the invention is not so limited but covers various apparent modifications and equivalent arrangements, which fall within the purview of the appended claims. Although features of the invention are expressed in certain combinations among the claims, it is contemplated that these features can be arranged in any combination and order. The invention has been described herein using specific embodiments for illustrative purposes only. It will be readily apparent to one of ordinary skill in the art, however, that the principles of the invention can be embodied in other ways. Therefore, the invention should not be regarded as limited in scope to the specific embodiments disclosed herein; it should be fully commensurate in scope with the following claims.

I claim:

1. A fully submergible aquatic life support device, comprising:
   a body having an inlet in fluid communication with an outlet by way of a hollow passageway coupled in between and extending through the body, the inlet and the outlet being open to an exterior thereby permitting fluid to move into the body through the inlet, through the hollow passageway, and out from the body through the outlet when the life support device is submerged;
   a waterproof fitting coupled with the inlet for selectively receiving and injecting a pressurized fluid into the interior of the hollow passageway;
   a light transmitting cover coupled with the inlet and the outlet forming a waterproof enclosure about the hollow passageway and wrapped around an exterior of the hollow passageway; and
   a light source within the waterproof enclosure positioned to emit light out through the light transmitting cover and into a fluid medium when the life support device is submerged.

2. The device of claim 1, wherein the inlet further includes a plurality of waterproof fittings.

3. The device of claim 1, wherein the inlet further includes a plurality of waterproof attachment points.

4. The device of claim 1, including a heat source positioned within the waterproof enclosure to emit heat out through the cover and into the fluid medium when the life support device is submerged.

5. The device of claim 4, wherein the heat source comprises a convection heater.

6. The device of claim 1, wherein the light source comprises a wavelength of 400 nM to 700 nM.

7. The device of claim 1, wherein the light source comprises LED lights.

8. The device of claim 2, including a gas source comprising a gas diffuser selectively coupled to one of the plurality of waterproof fittings.

9. The device of claim 8, including a control box in communication with the light source, the gas source, and a power supply.

10. The device of claim 1, including a stand selectively couplable to the life support device to position the body at an angle.

11. The device of claim 1, including a plurality of the life support devices coupled with one another via a network or a physical attachment.

12. The device of claim 1, including an air hose connected to the inlet in waterproof relation therewith.

* * * * *